(No Model.) 3 Sheets—Sheet 1.
A. A. McCANN.
AUTOGRAPHIC MANIFOLDING TABLET.
No. 439,887. Patented Nov. 4, 1890.
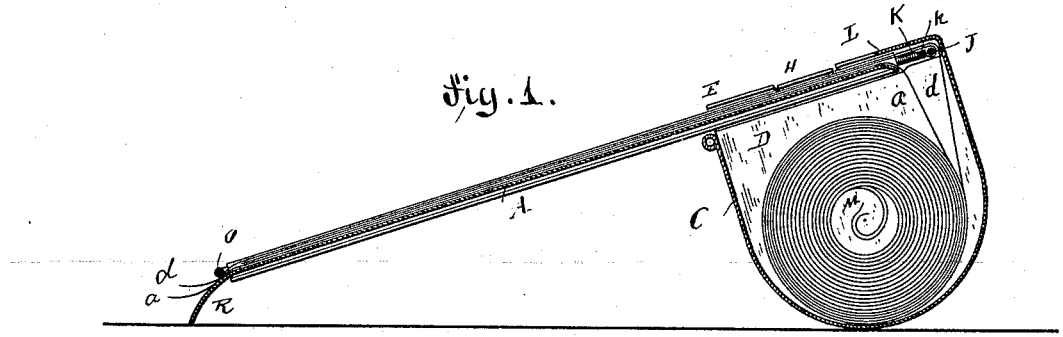
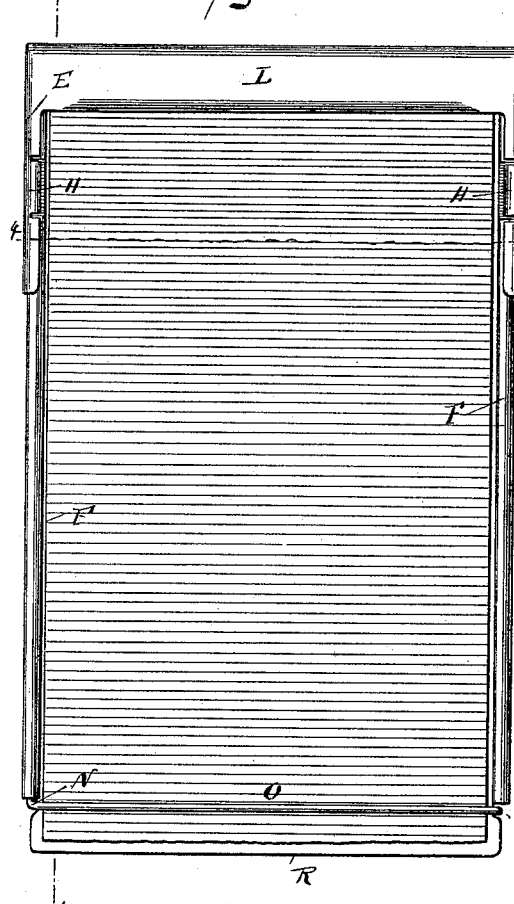
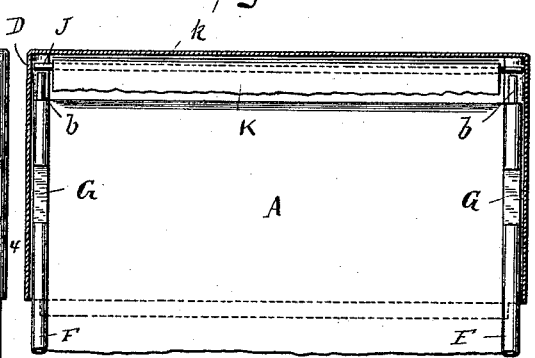
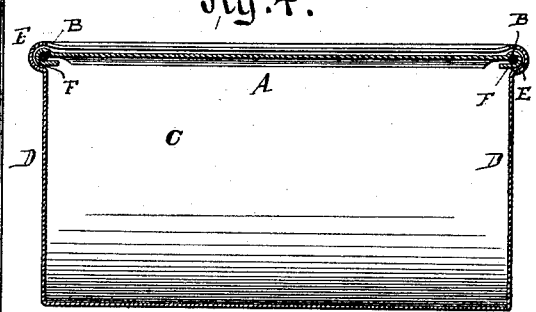
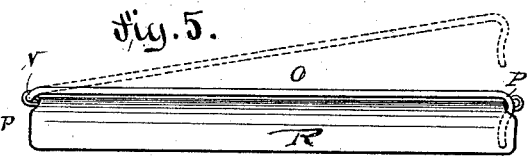
WITNESSES:
INVENTOR:
Adam A. McCann
BY
ATTORNEYS (No Model.) 3 Sheets—Sheet 2.
A. A. McCANN.
AUTOGRAPHIC MANIFOLDING TABLET.
No. 439,887. Patented Nov. 4, 1890.
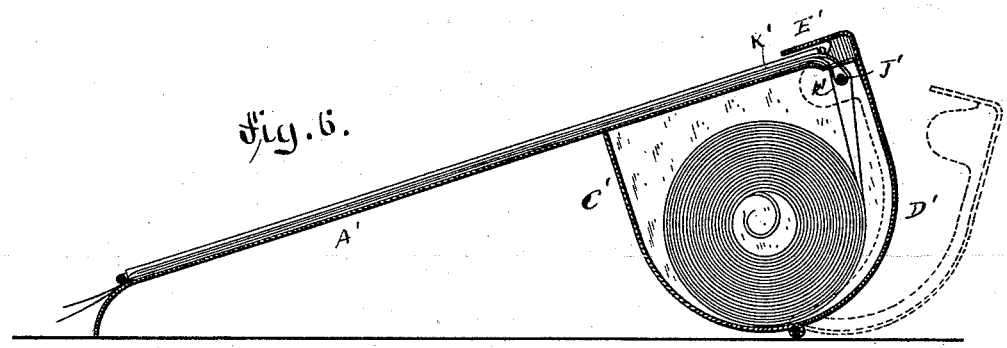
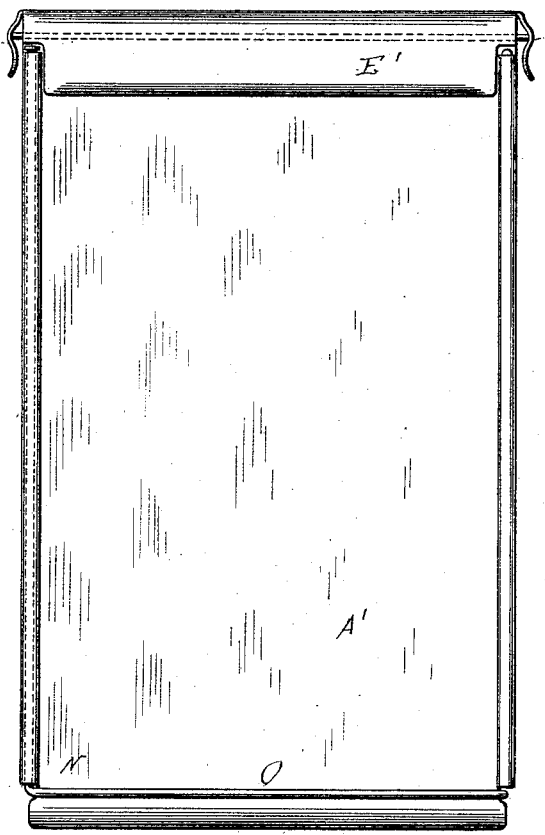
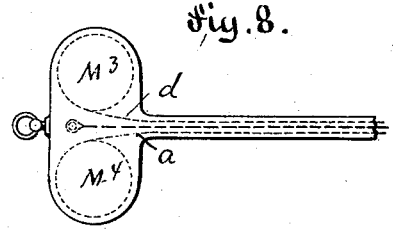
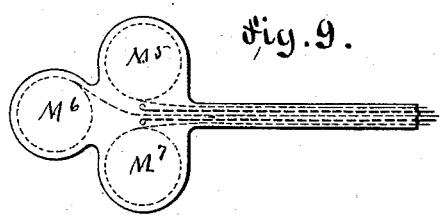
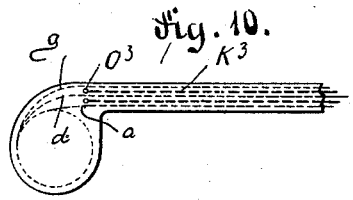
WITNESSES: INVENTOR (No Model.) 3 Sheets—Sheet 3.
A. A. McCANN.
AUTOGRAPHIC MANIFOLDING TABLET.
No. 439,887. Patented Nov. 4, 1890.
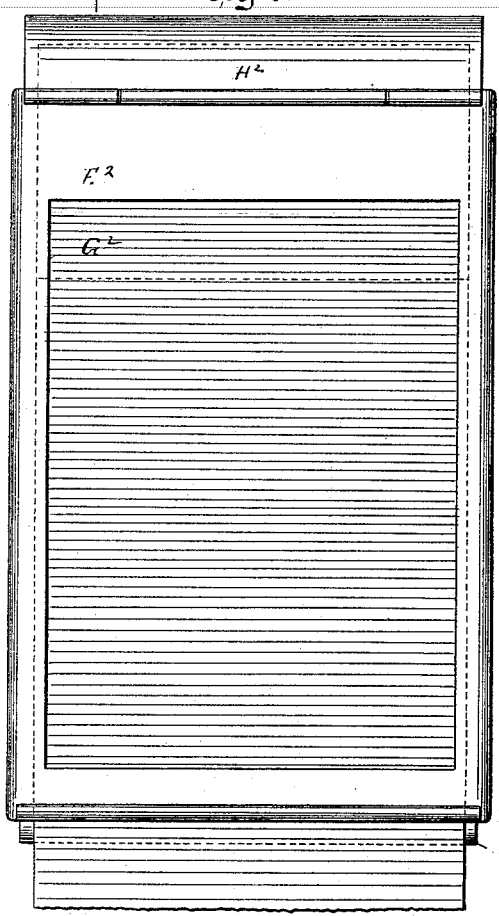
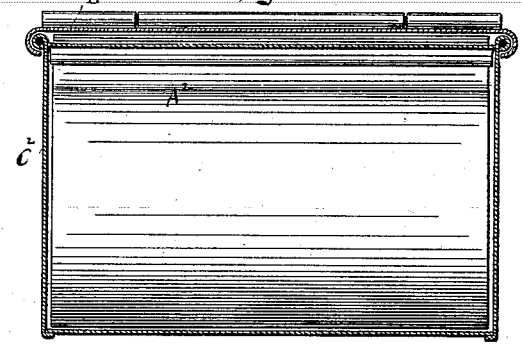
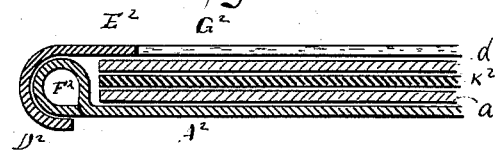
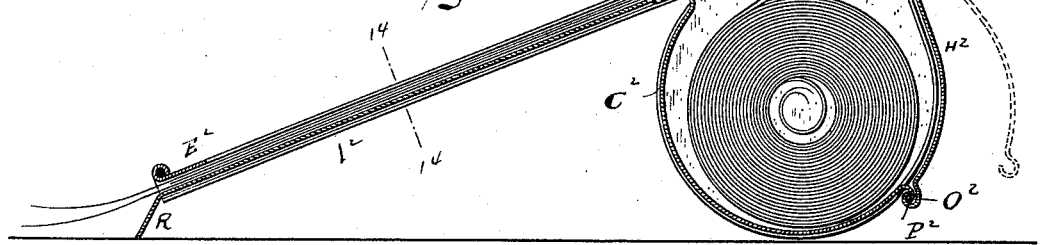
WITNESSES: INVENTOR:
Adam A. McCann
BY
ATTORNEYS

UNITED STATES PATENT OFFICE.

ADAM A. McCANN, OF NEW YORK, N. Y., ASSIGNOR TO HENRY V. PIAGET AND WILLIAM E. PIAGET, BOTH OF JERSEY CITY, NEW JERSEY.

AUTOGRAPHIC MANIFOLDING-TABLET.

SPECIFICATION forming part of Letters Patent No. 439,887, dated November 4, 1890.

Application filed March 21, 1890. Serial No. 344,781. (No model.)

*To all whom it may concern:*

Be it known that I, ADAM A. MCCANN, of the city of New York, in the county of New York and State of New York, a citizen of the United States, have invented certain new and useful Improvements in Autographic Manifolding-Tablets, of which the following is a specification.

The object of my invention is to provide a new and improved autographic manifolding-tablet, by means of which the salesman can produce in one operation two or more checks or bills, naming the article sold and the amounts paid, or other matter, which device is very compact, is simple in construction, and not apt to get out of order.

The invention consists in the construction and combination of parts and details, as will be fully described hereinafter, and finally be pointed out in the claims.

In the accompanying drawings, Figure 1 is a longitudinal sectional view of my improved autographic manifolding-tablet on the line 1 1, Fig. 2. Fig. 2 is a plan view of the same. Fig. 3 is a horizontal sectional view of the same, showing the manner of retaining the rod that holds the carbon-sheet. Fig. 4 is a transverse sectional view on the line 4 4, Fig. 2. Fig. 5 is a bottom end view. Fig. 6 is a vertical longitudinal sectional view of a modified construction of my improved autographic manifolding-tablet. Fig. 7 is a plan view of the same. Fig. 8 is a side view of an apparatus for two separate rolls of paper. Fig. 9 is a side view of an apparatus for three separate rolls. Fig. 10 is a side view of an apparatus for three strips of paper on one roll and two carbon-sheets. Fig. 11 is a plan view of another modification of my improved autographic manifolding-tablet. Fig. 12 is a vertical longitudinal sectional view of the same on the line 12 12, Fig. 11. Fig. 13 is a transverse sectional view of the same on the line 13 13, Fig. 12, the roll of paper being shown in section. Fig. 14 is an enlarged detail transverse sectional view on the line 14 14, Fig. 12. Fig. 15 is a detail horizontal sectional view showing the manner of securing the carbon-sheet.

Similar letters of reference indicate corresponding parts.

The plate or platform A is provided along its side edges with the hollow beads F, containing the stiffening-wires B, the ends of which project beyond the upper end of the plate A.

The receptacle C, which has a curved bottom and is open at the top, is provided along the top edges of its end pieces D with pockets or grooves E for receiving the upper end parts of the beads F and the ends $b$ of the wires B. The beads F have notches G, into which spring-catches H on the top edges of the end pieces D of the receptacle C can snap for the purpose of holding the receptacle on the plate. A rod J is placed into the receptacle C in such a manner that the ends rest in the grooves or pockets E, and is held in the rear closed ends of said grooves or pockets by the ends $b$ of the rods B, as shown in Fig. 3. Said rod or wire is passed through a loop $k$, formed at one end of the sheet K of manifolding paper. A flange L, formed on the top of the rear wall of the receptacle C, overlaps said upper end of the carbon-sheet.

A roll M of paper is placed into the receptacle C, which roll is formed of two strips of paper placed lengthwise upon each other and rolled up together. One of the strips $a$ rests upon the plate A, and the other $d$ upon the carbon-sheet K.

In one of the hollow beads F a wire N is mounted to turn, and is provided at the lower end of the plate A with an arm O, extending across the plate A, and provided on its end with a catch P for locking said arm transversely over the lower end of the plate, and thus holding the strips $a$ and $d$ snugly upon said plate.

The lower end of the plate A is provided with an inclined flange or wing R, which serves for tearing off the strips after they have been drawn out the required distance.

In the construction shown in Figs. 6 and 7 the plate or platform A is provided at its under side and at one end with a transverse receptacle C', made integral with said plate, the rear end of said receptacle forming a door or gate D', the hinge of which is at the bottom of the receptacle. Said gate is provided at its upper end with a flange or wing E', which when the door is closed projects over the upper part of the plate A'. Said gate is also provided with two bent spring side wings F'. A rod or wire J' is passed through a loop k', formed at one end of a carbon sheet K', the ends of the said rod or wire having been passed through apertures in the ends of the receptacle. When the gate D' is closed, the wings F' snap over the ends of said wire J', whereby said wire is locked in place, and the gate is locked in a closed position.

In the modification shown in Figs. 11 to 15 hollow or solid ribs $F^2$ are formed along the edges of the plate $A^2$ and serve as guides for the curved flanges $D^2$, formed along the edges of a frame $E^2$ of the same size as the platform, and having an opening $G^2$. A curved cover $H^2$ is hinged on the rear end of said frame $E^2$, and is provided on its swinging end with a curved flange $O^2$, adapted to engage a flange or rib $P^2$ along the edge of the receptacle $C^2$. The frame $E^2$ is slid on the plate $A^2$, and the cover $H^2$ is swung down so as to close the receptacle $C^2$, said cover being held in place by its flange $O^2$ engaging the rib $P^2$ on the receptacle $C^2$, as shown in Fig. 12. The receptacle $C^2$ is provided in each end with a slot or aperture $I^2$, adapted to receive the ends of a wire $J^2$, on which a carbon-sheet $K^2$ is fastened that extends over the upper surface of the plate $A^2$. To prevent said pin from moving longitudinally, it is provided with stops $S^2$, as shown in Fig. 15. If a salesman makes a sale, he fills in the blank bearing on the upper surface of the paper strip $a$, said upper surface being preferably printed in a conventional manner. At the same time, by means of the carbon-paper, the same writing, &c., is produced on the upper surface of the lower strip $d$. Then the clerk or salesman seizes those ends of the strips $a$ and $d$ projecting beyond the front ends of the plate, draws them lengthwise out of the apparatus until those parts of the sheets upon which he has written have been drawn entirely from the plate, and these parts of both strips $a$ and $d$ are then torn off along the edge of the wing or flange R. One is handed to the purchaser and the other to the cashier. The device is ready for use for making new checks or bills, and so on.

The apparatus can easily be filled with a fresh roll of paper, and the carbon-sheet, when the same is worn out, can easily be renewed.

The apparatus is very compact, can easily be held in the lap while writing or placed on a desk, as the upper surface is inclined. The apparatus is very simple in construction, is very light, and not apt to get out of order. If desired, a tally-sheet may be applied on the under side of the plate A; but this is not necessary.

In some cases it is desirable to produce three checks or bills at the same time, and in such cases the device shown in Fig. 10 is used. In the same three strips of paper $a$, $d$, and $g$ are rolled up to form the roll; but in this construction the third sheet $g$ passes around an additional pin $O^3$, carrying a carbon-sheet $K^3$, so that one original and three carbon copies are produced at the same time. If desired, two strips of paper may be wound to form separate rolls $M^3$ and $M^4$, as shown in Fig. 8; or, if three strips are used, they may form three separate and distinct rolls $M^5$, $M^6$, and $M^7$, Fig. 9.

In place of a roll composed of two or more strips, a roll composed of a single strip may be used, and in that case the carbon-sheet can be dispensed with.

Having thus described my invention, I claim as new and desire to secure by Letters Patent—

1. The combination, with a plate having a receptacle at one end, of a carbon-sheet held above said plate, and two strips of paper rolled together to form a roll within the receptacle, one strip of paper passing over the plate under the carbon-sheet and the other passing over the carbon-sheet, substantially as set forth.

2. The combination, with a plate having a receptacle at one end, of a carbon-sheet, two strips of paper rolled to form a roll within the receptacle, one strip passing over the plate below the carbon-sheet and the other strip passing over the carbon-sheet, and means for holding said strips and the carbon-sheet flat upon the plate, substantially as set forth.

3. The combination, with a plate having a receptacle at one end, of a transverse wire or rod in said receptacle, a carbon-sheet held on said wire or rod, and two strips of paper wound to form a single roll, one strip of paper being passed over the upper edge of the plate and resting on the surface of said plate and the other strip being passed around the wire or rod that holds the carbon-sheet and passed over said carbon-sheet, substantially as set forth.

4. The combination, with a plate having a receptacle at one end, of a wire for holding the carbon-sheets and a wire mounted to turn on one edge of the plate and provided at its lower end with an arm extending across said plate, and a catch formed on the end of said arm, substantially as set forth.

In testimony that I claim the foregoing as my invention I have signed my name in presence of two subscribing witnesses.

ADAM A. McCANN.

Witnesses:
OSCAR F. GUNZ,
W. REIMHERR.